United States Patent
Chen et al.

(10) Patent No.: US 10,062,941 B2
(45) Date of Patent: Aug. 28, 2018

(54) INDIRECT TRANSMISSION TYPE AUTOMATIC FREQUENCY MODULATION FILTER

(71) Applicant: Universal Microwave Technology, Inc., Keelung (TW)

(72) Inventors: Yu-Cheng Chen, Taipei (TW); Chien-Chih Li, Taipei (TW); Jen-Ti Peng, Keelung (TW); Chun-Wei Chen, New Taipei (TW); Chun-Kai Wang, Tainan (TW); Chun-Yu Chu, Chiayi County (TW)

( * ) Notice: Subject to any disclaimer, the term of this patent is extended or adjusted under 35 U.S.C. 154(b) by 111 days.

(21) Appl. No.: 15/286,585

(22) Filed: Oct. 6, 2016

(65) Prior Publication Data

US 2018/0102579 A1  Apr. 12, 2018

(51) Int. Cl.
| | |
|---|---|
| *H01P 1/208* | (2006.01) |
| *H01P 7/06* | (2006.01) |
| *H01P 1/207* | (2006.01) |
| *H02K 37/00* | (2006.01) |
| *H01P 1/205* | (2006.01) |

(52) U.S. Cl.
CPC .............. *H01P 1/208* (2013.01); *H01P 1/207* (2013.01); *H01P 1/2053* (2013.01); *H01P 7/06* (2013.01); *H02K 37/00* (2013.01)

(58) Field of Classification Search
CPC ........ H01P 1/205; H01P 1/2053; H01P 1/208; H01P 7/06
USPC .................................................. 333/207, 209
See application file for complete search history.

(56) References Cited

U.S. PATENT DOCUMENTS

| 7,825,753 B2 * | 11/2010 | Park ...................... H01P 1/2053 333/203 |
| 2011/0266982 A1 * | 11/2011 | Rollman ................. H02P 29/02 318/376 |

\* cited by examiner

*Primary Examiner* — Rakesh Patel

(57) ABSTRACT

Disclosed is an indirect transmission type automatic frequency modulation filter including a microwave body, a moving plate, a fastener, and a motor unit. The microwave body has plural openings. The moving plate includes a board, plural lugs and a first moving member, and the lugs and the first moving member form the board. The fastener includes a support base and a second moving member. The motor unit includes a rod and a driver, and the driver determines a clockwise rotation or a counterclockwise rotation and drives the rod to move the moving plate towards or away from the microwave body so as to insert the lugs into cavities to a desired depth and adjust a center frequency.

9 Claims, 4 Drawing Sheets

INDIRECT TRANSMISSION TYPE AUTOMATIC FREQUENCY MODULATION FILTER

BACKGROUND OF THE INVENTION

Field of the Invention

The present invention relates to the field of an automatic frequency modulation filter, in particular to an indirect transmission type automatic frequency modulation filter that changes the center frequency of the filter by moving a moving member.

Description of Related Art

In the conventional process of manufacturing filters, a network analyzer is generally provided for measurements, and a manual method is used to adjust the center frequency of the filter. In other words, after the filter is adjusted and packaged, the center frequency cannot be adjusted by users anymore.

A user needs to send the packaged filter to its original manufacturer, and then the manufacturer unpacks and re-adjusts the filter in order to change the center frequency. Obviously, it is very inconvenient to the manufacturer and end customer. In most cases, an adjustment of the filter is required after the filter has been integrated with a communication device. Unless the communication device is removed, the operation consumes much time and incurs a high cost, and also affects the transmission of signals in communications.

In view of the aforementioned drawbacks, the present invention provides an indirect transmission type automatic frequency modulation filter to overcome the drawbacks of the prior art.

SUMMARY OF THE INVENTION

It is a primary objective of the present invention to provide an indirect transmission type automatic frequency modulation filter capable of adjusting the depth of a plurality of lugs inserted into cavities to adjust a center frequency of the filter.

A secondary objective of the present invention is to provide the aforementioned indirect transmission type automatic frequency modulation filter that transmits an external frequency signal (which is the required frequency of the filter) to a motor unit and converts the external frequency signal into a displacement angle of the motor unit (such as a stepper motor), and the stepper motor is rotated to drive a gear set or a rod moving plate to change the center frequency of the filter while maintaining the original frequency response and other properties of the filter.

A tertiary objective of the present invention is to provide the aforementioned indirect transmission type automatic frequency modulation filter having a guide pin and a guide hole to prevent any unsmooth movement caused by the dislocation between the motor unit and the moving plate due to assembling tolerance.

A quaternary objective of the present invention is to provide the aforementioned indirect transmission type automatic frequency modulation filter that installs a moving plate at a groove of a moving plate, so that the motor unit can move the moving plate indirectly.

A quinary objective of the present invention is to provide the aforementioned indirect transmission type automatic frequency modulation filter having the moving plate installed at an embedded groove of the moving plate, so that the motor unit can move the moving plate indirectly.

A senary objective of the present invention is to provide the aforementioned indirect transmission type automatic frequency modulation filter having a return unit capable of releasing a restoring force from the microwave body to the moving plate.

To achieve the aforementioned and other objectives, the present invention provides an indirect transmission type automatic frequency modulation filter comprising a microwave body, a moving plate, a fastener and a motor unit. The microwave body has a plurality of openings. The moving plate includes a board, a plurality of lugs, and a first moving member, and the lugs and the first moving member are formed on the board. Wherein, each cavity is configured to be corresponsive to each respective lug. In some cases, additional lugs may be added between cavities. The fastener includes a support base and a second moving member. The support base is disposed on the microwave body. Wherein, the second moving member is configured to be corresponsive to the first moving member. The motor unit includes a rod and a driver. The motor unit is installed at the microwave body through a motor holder. The driver determines a clockwise rotation or a counterclockwise rotation to drive the rod to move the moving plate towards or away from the microwave body. The lugs are inserted into the cavities to a certain depth to adjust a center frequency.

Wherein, the lugs are formed on a side of the board, and the first moving member is formed on the other side of the board.

Wherein, the first moving member is a guide pin and the second moving member is a guide hole, or the first moving member is a guide hole and the second moving member is a guide pin.

The moving plate further includes a groove formed on the board, and the groove is broken to form a hole.

The indirect transmission type automatic frequency modulation filter further comprises a moving plate, and the moving plate is broken to form a moving opening, and the moving opening is formed on a side of the groove, and the moving opening selectively has an internal thread formed thereon, and the moving opening is configured to be corresponsive to the hole, such that the moving opening is combined with an external thread of the rod.

The moving plate further includes an embedded groove, and both sides of the embedded groove are selectively broken to form a hole each, and the holes selectively have an internal thread formed thereon.

The indirect transmission type automatic frequency modulation filter further comprises a moving plate, and the moving opening is formed at the embedded groove, and the moving opening selectively has an internal thread formed thereon, and the moving opening is configured to be corresponsive to the holes for combining an external thread of the rod.

The indirect transmission type automatic frequency modulation filter further comprises a return unit, and the return unit is installed between the fastener and the moving plate and provided for releasing a restoring force from the fastener to the moving plate.

Wherein, the driver receives an external frequency signal, and converts the external frequency signal into a drive signal to determine at least one selected from the group consisting of the angle of rotation, the quantity of turns, and the speed of the rod.

Wherein, the motor unit is a stepper motor.

Compared with the prior art, the present invention provides an indirect transmission type automatic frequency modulation filter that moves the moving plate towards or away from the microwave body indirectly by the motor unit to change the depth of the plurality of lugs to be inserted into the cavities, so as to adjust a center frequency.

DETAILED DESCRIPTION OF THE INVENTION

The aforementioned and other objects, characteristics and advantages of the present invention will become apparent with the detailed description of the preferred embodiments and the illustration of related drawings as follows.

Figure 1:
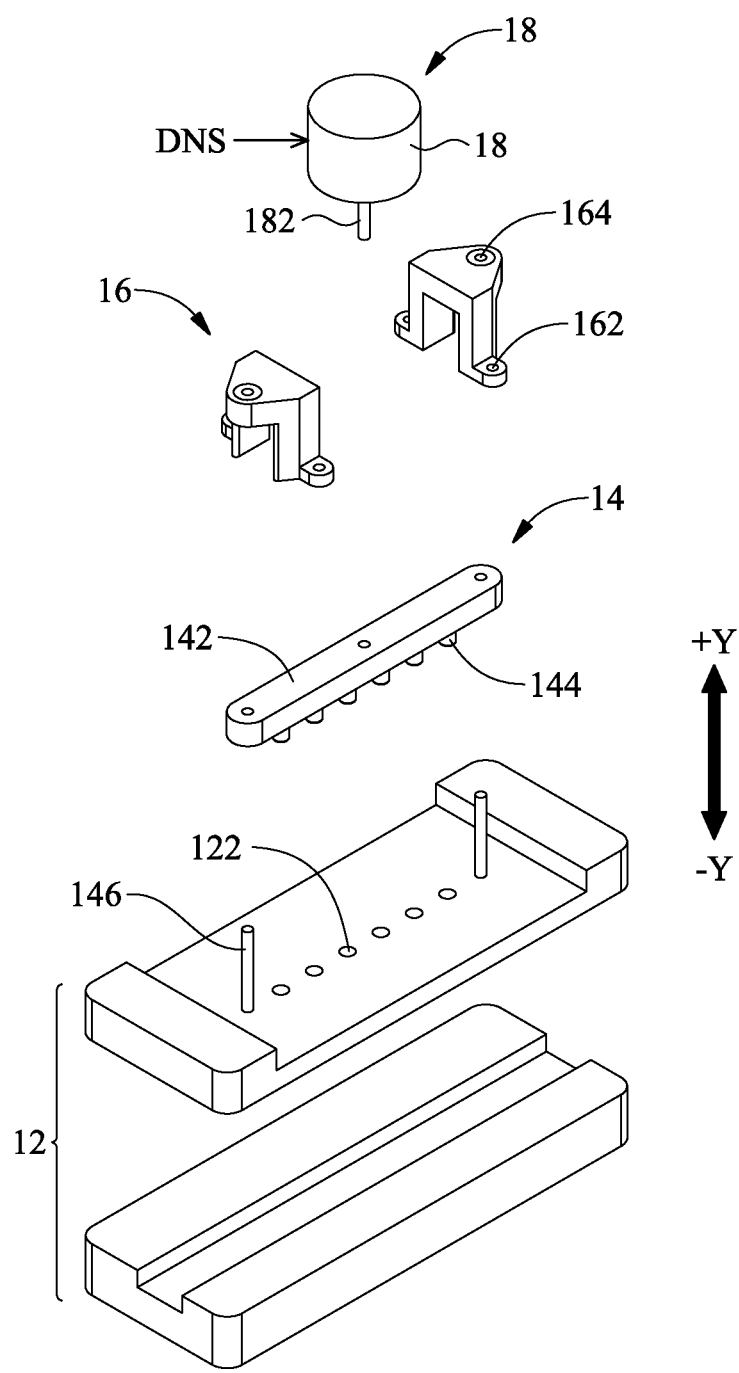
FIG. 1 is an exploded view of an indirect transmission type automatic frequency modulation filter in accordance with a first preferred embodiment of the present invention.

With reference to FIG. 1 for a schematic view of an indirect transmission type automatic frequency modulation filter in accordance with the first preferred embodiment of the present invention, the indirect transmission type automatic frequency modulation filter 10 comprises a microwave body 12, a first moving plate 14, a fastener 16, and a motor unit 18.

The microwave body 12 includes a plurality of cavities 122, and the quantity of cavities 122 may be increased or decreased as needed. In this embodiment, the quantity of cavities 122 is equal to 6.

Figure 2:
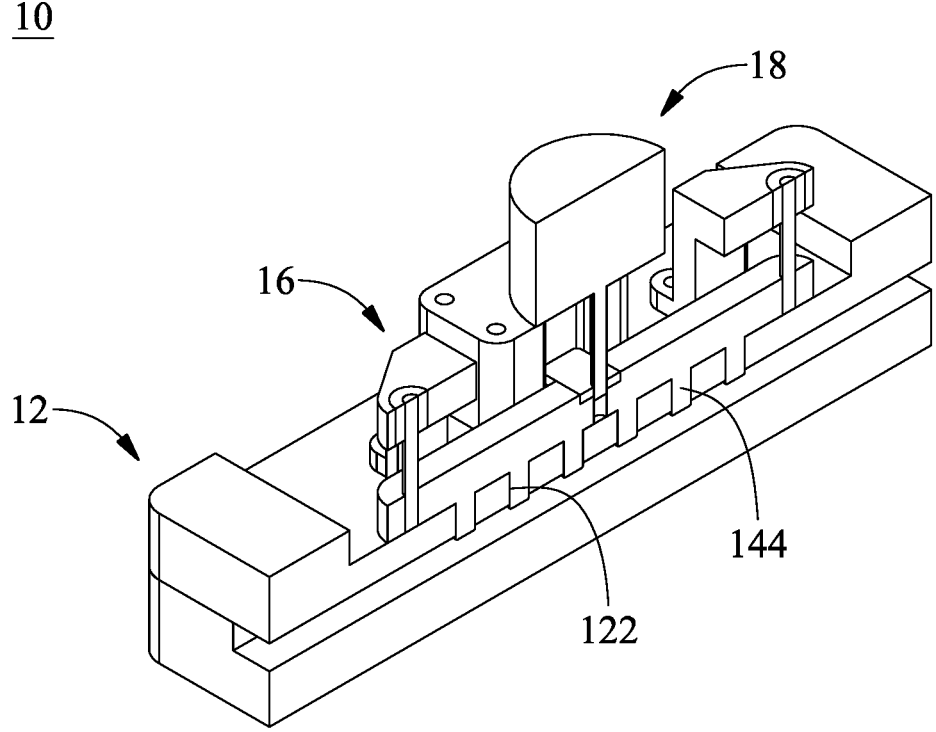
FIG. 2 is a cross-sectional view of the indirect transmission type automatic frequency modulation filter of FIG. 1.

The first moving plate 14 includes a board 142, a plurality of lugs 144, and a first moving member 146. In this embodiment, the lugs 144 is formed on a side of the board 142, and the first moving member 146 is formed on the other side of the board 142. In another embodiment, the lugs 144 and the first moving member 146 may be formed on the same side. The first moving member 146 may be a guide pin or a guide hole. In this embodiment, the first moving member 146 is a guide pin. The lugs 144 and the first moving member 146 are formed on the board 142. Wherein, the lugs 144 and the cavity 122 may be designed with a shape according to actual requirements. With reference to FIG. 2 for a cross-sectional view of an indirect transmission type automatic frequency modulation filter in accordance with the present invention, each cavity 122 is configured to be corresponsive to each lug 144.

The fastener 16 includes a support base 162 and a second moving member 164. The second moving member 164 may be a guide pin or a guide hole. In this embodiment, the second moving member 164 is a guide hole. The support base 162 is disposed at the microwave body 12. Wherein, the second moving member 164 is configured to be corresponsive to the first moving member 146.

The motor unit 18 includes a rod 182 and a driver 184. For example, the motor unit 18 is a stepper motor or a servomotor. The motor unit 18 is installed at the microwave body 12. The driver 184 determines a clockwise rotation or a counterclockwise rotation according to a drive signal DSN and allows the rod 182 to drive the first moving plate 14 to move in a direction such as the +Y direction or −Y direction. The rod 182 is driven to move the first moving plate 14 towards or away from the microwave body 12, so as to determine the depth of the lugs 144 being inserted into the cavities 122 and adjust the center frequency of the filter. In another embodiment, the driver 184 may receive an external frequency signal, and the external frequency signal is converted into the drive signal DSN to determine at least one selected from the angle of rotation, the number of turns, and the speed of the rod 182.

It is noteworthy that while the motor unit 18 is driving the rod 182, the first moving member 146 is sheathed on the second moving member 164 to move the first moving plate 14 steadily towards a direction (such as the vertical direction).

Figure 3:
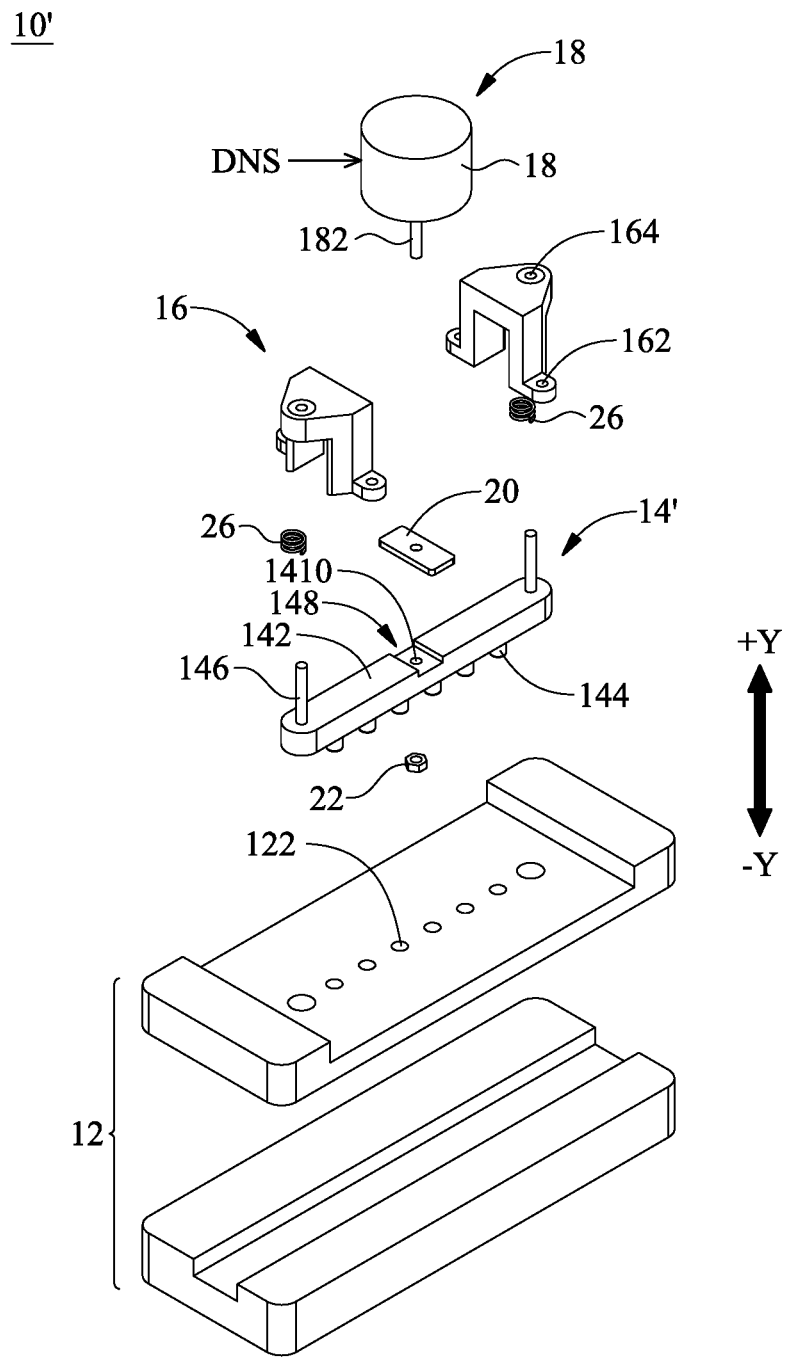
FIG. 3 is a schematic view of an indirect transmission type automatic frequency modulation filter in accordance with a second preferred embodiment of the present invention.

With reference to FIG. 3 for a schematic view of an indirect transmission type automatic frequency modulation filter in accordance with the second preferred embodiment of the present invention, the indirect transmission type automatic frequency modulation filter 10' further comprises a first moving plate 14', a second moving plate 20 and a return unit 22 in addition to the microwave body 12, the fastener 16 and the motor unit 18 of the first preferred embodiment.

The first moving plate 14' further includes a groove 148. The groove 148 is formed on the board 142. The groove 148 is broken to form a hole 1410. The hole 1410 may or may not have an internal thread.

The second moving plate 20 is broken to form a moving opening 202. The moving opening 202 is formed on a side of the groove 148. In this embodiment, the moving opening 202 has an internal thread formed thereon. The moving opening 202 is configured to be corresponsive to the hole 1410. The moving opening 202 is combined with an external thread of the rod 182.

The motor unit 18 may be rotated clockwise or counterclockwise to move the moving opening 202 towards the +Y direction or the −Y direction.

The return unit 22 is installed between the filter body 12 (or the fastener 16) and the first moving plate 14' and provided for releasing a restoring force from the filter body 12 (or the fastener 16) to the first moving plate 14'. The restoring force is provided for restoring the first moving plate 14' to its initial position.

Figure 4:
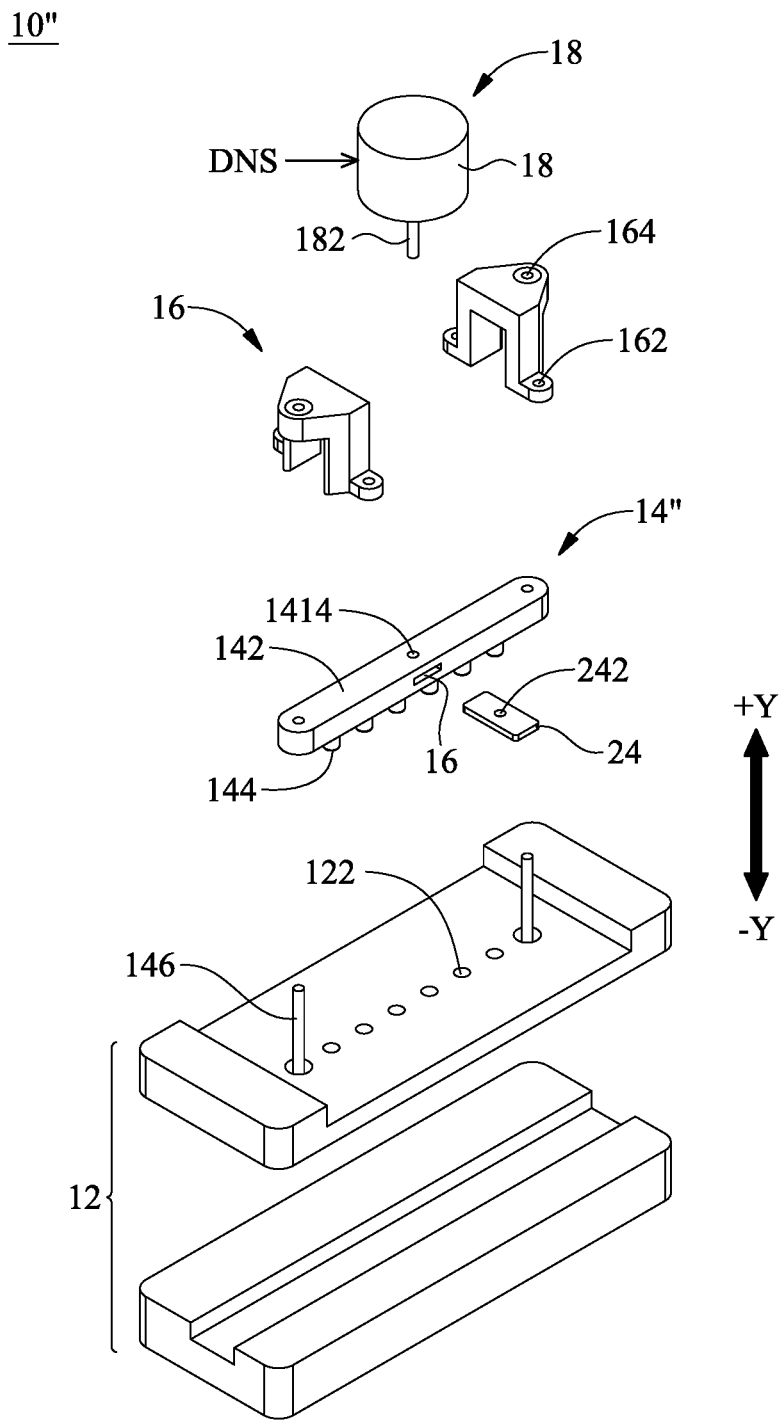
FIG. 4 is a schematic view of an indirect transmission type automatic frequency modulation filter in accordance with a third preferred embodiment of the present invention.

With reference to FIG. 4 for a schematic view of an indirect transmission type automatic frequency modulation filter in accordance with the third preferred embodiment of the present invention, the indirect transmission type automatic frequency modulation filter 10" further comprises a first moving plate 14" and a second moving plate 24, in addition to the microwave body 12, the fastener 16 and the motor unit 18 of the first preferred embodiment.

The first moving plate 14" further includes an embedded groove 1412. Both sides of the embedded groove 1412 may selectively be broken to form a hole 1414. The holes 1414 may or may not have an internal thread. In this embodiment, a side of the first moving plate 14" is broken to form the hole 1414.

The second moving plate 24 is broken to form a moving blind hole 242. The moving blind hole is formed at the embedded groove embedded groove 1412. The moving blind hole 242 is configured to be corresponsive to the hole 1414 for combining the moving blind hole 242 with the external thread of the rod 182.

While the invention has been described by means of specific embodiments, numerous modifications and variations could be made thereto by persons skilled in the art without departing from the scope and spirit of the invention set forth in the claims.

What is claimed is:

1. An indirect transmission type automatic frequency modulation filter, comprising:
    a microwave body, having a plurality of openings and a plurality of cavities, and each of the plurality of cavities being configured to be corresponsive to each respective opening;
    a first moving plate, having a board, a plurality of lugs, and a first moving member, and the plurality of lugs and the first moving member being formed on the board, and each of the plurality of openings being configured to be corresponsive to each respective lug;
    a fastener, having a support base and a second moving member, and the support base being disposed at the microwave body, and the second moving member being configured to be corresponsive to the first moving member; and
    a motor unit, having a rod and a driver, a motor holder, installed at the microwave body, and the driver determining a clockwise rotation or a counterclockwise rotation, so as to drive the rod to move the first moving plate towards or away from the microwave body, and adjust a center frequency by inserting the lugs to a depth of the plurality of cavities,
    wherein the first moving member is a guide pin and the second moving member is a guide hole, or the first moving member is a guide hole and the second moving member is a guide pin.

2. The indirect transmission type automatic frequency modulation filter according to claim 1, wherein the plurality of lugs are formed on a side of the board, and the first moving member is formed on another side of the board.

3. The indirect transmission type automatic frequency modulation filter according to claim 1, wherein the motor unit is a stepper motor.

4. The indirect transmission type automatic frequency modulation filter according to claim 1, wherein the first moving plate further includes a groove formed on the board, and the groove is broken to form a hole.

5. The indirect transmission type automatic frequency modulation filter according to claim 4, further comprising a second moving plate, and the second moving plate being broken to form a moving opening, and the moving opening being formed on a side of the groove, and the moving opening selectively having an internal thread formed thereon, and the moving opening being configured to be corresponsive to the hole, such that the moving opening is combined with an external thread of the rod.

6. The indirect transmission type automatic frequency modulation filter according to claim 1, wherein the first moving plate further includes an embedded groove, and two sides of the embedded groove are selectively broken to form a hole each, and the holes selectively have an internal thread formed thereon.

7. The indirect transmission type automatic frequency modulation filter according to claim 6, further comprising a second moving plate, and the second moving plate being broken to form a moving opening, and the moving opening being formed at the embedded groove, and the moving opening selectively having an internal thread formed thereon, and the moving opening being configured to be corresponsive to the holes, for combining an external thread of the rod.

8. The indirect transmission type automatic frequency modulation filter according to claim 1, further comprising a return unit, and the return unit being installed between the fastener and the first moving plate and provided for releasing a restoring force from the fastener to the first moving plate.

9. The indirect transmission type automatic frequency modulation filter according to claim 1, wherein the driver receives an external frequency signal, and converts the external frequency signal into a drive signal to determine at least one selected from the group consisting of an angle of rotation, a quantity of turns, and a speed of the rod.

* * * * *